(12) United States Patent
Bailly et al.

(10) Patent No.: US 9,183,160 B2
(45) Date of Patent: Nov. 10, 2015

(54) INTEGRATED CIRCUIT BOARD WITH SECURED INPUT/OUTPUT BUFFER

(75) Inventors: Alexis Bailly, Deuil la Barre (FR); David Decroix, Montreuil (FR); Louis-Philippe Goncalves, Deuil la Barre (FR); Cyrille Pepin, Andresy (FR); Guillaume Roudiere, Boulogne (FR)

(73) Assignee: MORPHO, Paris (FR)

( * ) Notice: Subject to any disclaimer, the term of this patent is extended or adjusted under 35 U.S.C. 154(b) by 856 days.

(21) Appl. No.: 12/677,696

(22) PCT Filed: Sep. 12, 2008

(86) PCT No.: PCT/FR2008/001276
§ 371 (c)(1),
(2), (4) Date: May 6, 2010

(87) PCT Pub. No.: WO2009/068760
PCT Pub. Date: Jun. 4, 2009

(65) Prior Publication Data
US 2010/0211727 A1  Aug. 19, 2010

(30) Foreign Application Priority Data
Sep. 14, 2007 (FR) ...................................... 07 06447

(51) Int. Cl.
*G06F 12/14* (2006.01)

(52) U.S. Cl.
CPC .................................. *G06F 12/1425* (2013.01)

(58) Field of Classification Search
CPC ..................................................... G06F 12/1425
See application file for complete search history.

(56) References Cited

U.S. PATENT DOCUMENTS

| 5,802,519 A | 9/1998 | Jong | |
| 7,681,000 B2* | 3/2010 | Funk et al. | 711/163 |
| 8,103,844 B2* | 1/2012 | Beaver | 711/163 |
| 2003/0163717 A1* | 8/2003 | Yoshimoto et al. | 713/193 |
| 2005/0283566 A1* | 12/2005 | Callaghan | 711/104 |

FOREIGN PATENT DOCUMENTS

| EP | 0331407 | 9/1989 |
| EP | 0955602 | 11/1999 |
| EP | 1615164 | 1/2006 |
| EP | 1672566 | 6/2006 |

* cited by examiner

*Primary Examiner* — Michael Alsip
(74) *Attorney, Agent, or Firm* — Muncy, Geissler, Olds & Lowe P.C.

(57) ABSTRACT

An integrated circuit card including a processor unit associated with RAM and with data exchange means for exchanging data with an external device, the RAM including a memory zone dedicated to exchanged data, and the processor unit being arranged to secure the dedicated memory zone and to store the exchanged data in said zone, and a method of managing the RAM of such a card.

10 Claims, 1 Drawing Sheet

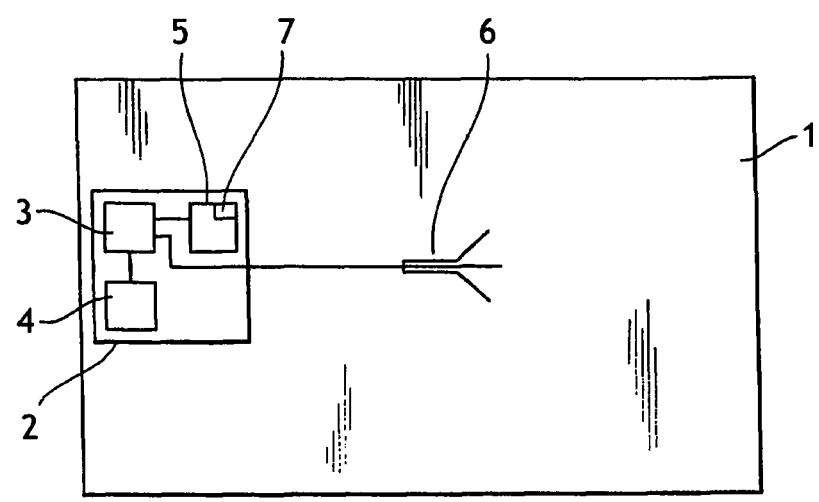

INTEGRATED CIRCUIT BOARD WITH SECURED INPUT/OUTPUT BUFFER

The present invention relates to an integrated circuit card that is usable, in particular, as a data medium, e.g. for constituting means for identifying a carrier of the card, means for giving access to premises or to equipment, payment means such as a bank card or a telephone card, . . . .

BACKGROUND OF THE INVENTION

An integrated circuit card generally comprises a body having an integrated circuit incorporated therein, which circuit contains a processor unit associated with random access memory (RAM) and with data exchange means for exchanging data with an external device, such as a card reader. By way of example, the data exchange means comprise conductive areas for co-operating with electrodes of the external device, or a transceiver antenna for exchanging electromagnetic signals with an antenna of the external device. The processor unit, a microprocessor, performs operations on the data, and more particularly cryptographic calculations, that serve in particular to enable the processor unit to verify whether it is authorized to engage in a transaction with the external device to which it is connected by the exchange means. The RAM is used to store both data that is exchanged with the external device, and internal operating data such as intermediate results that are reused in the operations performed by the processor unit.

Such cards sometimes contain information that is confidential, such as a secret code, or they give access to premises or to equipment containing such information, and they are sometimes subjected to attempts at fraud that seek to disturb the operation of the processor unit in order to cause it to communicate confidential data with the outside or to reveal how it operates.

Such attempts at fraud are generally performed by making use of the RAM either in order to cause scraps of instructions to be stored therein, scraps that are inoffensive on their own, but that the processor unit will assemble and thereby constitute instructions that endanger the security of the card; or in order to recover therefrom information that the processor unit stores temporarily therein and that is not normally intended to be transmitted to the outside.

OBJECT OF THE INVENTION

An object of the invention is to provide means enabling the exchange of information with the outside to be controlled in order to provide the card with protection.

SUMMARY OF THE INVENTION

To this end, the invention provides an integrated circuit card including a processor unit associated with RAM and with data exchange means for exchanging data with an external device, the RAM including a memory zone dedicated to exchanged data, and the processor unit is arranged to secure the dedicated memory zone and to store the exchanged data in said zone.

The exchanged data is data that is received or that is to be transmitted. Thus, only exchanged data is contained in the dedicated memory zone from where it can be exchanged with the outside. The software security provided by the processor unit serves to limit any risk of said zone containing data that is harmful for the security of the card, i.e. either scraps of instructions that are inoffensive taken individually but that constitute harmful instructions once assembled together, or else internal operating data that should normally not be communicated to the outside. The processor unit prevents the simultaneous presence of these scraps of instructions in memory and the storage of said internal operating data. The fact of having a dedicated memory zone makes it easier to perform surveillance by limiting the number of potentially dangerous bytes, and has no significant incidence on the performance of the card.

In a first security technique, the processor unit is programmed to alter the data in the dedicated memory zone before transferring data from the outside.

This avoids any data received by the card for a first command being usable in combination with data received for a second command, or being used directly. Data received on successive occasions by the card therefore cannot be recombined or used to constitute harmful instructions.

In a second security technique, the processor unit is programmed to lock access to the dedicated memory zone while performing a processing operation.

Thus, while it is in operation, the processor unit cannot store data in the dedicated memory zone, thereby eliminating any risk of such data, and more particularly any secret or sensitive data, subsequently being transmitted to the outside.

Under such circumstances, and advantageously, the processor unit is programmed to evaluate a status of the data in the dedicated memory zone before performing a processing operation, and to verify the integrity of the data after the processing operation.

Any storage of data in the dedicated memory zone would then give rise to a lack of integrity in said zone, thus revealing an attempted fraud.

The invention also provides a method of managing RAM of an integrated circuit card including a processor unit associated with the RAM and with data exchange means for exchanging data with an external device, the method comprising the steps of:

defining in the RAM a zone that is dedicated to the exchanged data; and controlling the processor unit to secure said zone and to store the exchanged data therein.

Other characteristics and advantages of the invention appear on reading the following description of a particular, a nonlimiting embodiment of the invention.

BRIEF DESCRIPTION OF THE DRAWINGS

Reference is made to the sole FIGURE that is a diagram showing a card in accordance with the invention.

DETAILED DESCRIPTION OF THE INVENTION

With reference to the FIGURE, the card comprises, in conventional manner, a body 1 having an integrated circuit 2 incorporated therein, the integrated circuit comprising a processor unit 3 in the form of a microprocessor, read only memory (ROM) 4, and RAM 5. The ROM 4 contains one (or more) operating programs that are designed to be executed by the processor unit 3 in order to enable it to perform predetermined operations. These operations include operations of receiving data, operations of processing data, and operations of transmitting data. By way of example, the processing operations in question are cryptographic calculations and authentication procedures. The RAM 5 is used by the processor unit 3 in order to store data therein. The integrated circuit 2 is connected to an antenna 6 constituting means for exchanging data with an external device D, here formed by a contactless card reader.

A memory zone dedicated to the exchanged data is defined in the RAM 5. The dedicated memory zone, referenced 7, is bounded so that it cannot be extended during operation of the processor unit 3.

The operating program executed by the processor unit 3 is arranged to oblige the processor unit 3 to store in the dedicated memory zone 7 any data it exchanges, i.e. data it receives from the antenna 6 and data it is preparing to transmit to the external device D via the antenna 6.

Before transmitting data, the processor unit 3 is programmed to verify that the data is contained in the dedicated memory zone 7.

The operating program is also arranged so that, prior to each reception of data, the processor unit 3 alters the data contained in the dedicated memory zone 7. This alteration consists in scrambling the data contained in said zone. This operation can be thought of as erasing said data.

The operating program of the processor unit 3 is also arranged to lock the dedicated memory zone 7 while operations are being performed by the processor unit 3. Here, this locking consists initially in the operating program preventing the processor unit 3 from storing information in the dedicated memory zone 7 during the processing operations. Secondly, locking comprises the steps of evaluating a status of the data in the dedicated memory zone 7 before performing an operation of processing and then verifying the integrity of the data contained in the dedicated memory zone 7 after the processing operation. This integrity verification is performed by calculating a polynomial on the bytes present in the dedicated memory zone 7 before the processing operation, and in calculating the same polynomial again after the processing operation. All that then remains to be done is to compare the two resulting polynomials. This polynomial, also known as a checksum or as a cyclic redundancy check (CRC) is obtained in conventional manner by processing a data block as though it constitutes a string of binary coefficients of a polynomial. Thus, all data storage performed after the integrity calculation has been performed will modify the value of the data. The integrity verification will reveal any such non-authorized storage that is indicative of a malfunction.

The card in accordance with the invention thus includes RAM provided with a dedicated memory zone for exchanged data, and software security that serves to control the storage of data in this zone.

It should be observed that the card in accordance with the invention requires only one memory zone dedicated to exchanging data, this memory zone containing exchanged data.

Naturally, the invention is not limited to the embodiment described and variations may be applied thereto without going beyond the ambit of the invention as defined by the claims.

In particular, the invention is applicable to any type of card, and in particular to contact cards that present conductive areas for co-operating with electrodes of a card reader.

The security techniques described may be used independently of one another or in combination.

It is possible to use other techniques for verifying integrity.

The invention claimed is:

1. An integrated circuit card including a processor unit associated with RAM and with data exchange means for exchanging data with an external device,
    wherein the RAM includes only one dedicated memory zone dedicated to exchanged data,
    wherein said only one dedicated memory zone is less than an entirety of the RAM and is bounded so that it cannot be extended during operation of the processor unit,
    wherein only the exchanged data is stored in the only one dedicated memory zone,
    wherein the only one dedicated memory zone must store all of the exchanged data, the processor unit being arranged to store any data that is exchanged between the integrated circuit card and the external device in said only one dedicated memory zone, and
    wherein the processor unit is arranged to limit any risk of said only one dedicated memory zone containing data that is harmful for security of the integrated circuit card by being programmed to scramble the data in the only one dedicated memory zone before transferring data from the outside in order that data received on successive occasions by the card cannot be recombined or used to constitute harmful instructions.

2. The integrated circuit card according to claim 1, wherein the processor unit is programmed to lock access to the only one dedicated memory zone during a processing operation.

3. The card according to claim 2, wherein the processing unit is programmed to calculate an integrity value of the data in the only one dedicated memory zone before performing a processing operation, and to verify the integrity value of the data after performing the processing operation.

4. The card according to claim 1, wherein, before transmitting data, the processor unit is programmed to verify that the data is contained in the only one dedicated memory zone.

5. A method of managing RAM of an integrated circuit card having a processor unit associated with the RAM and with data exchange means for exchanging data with an external device, wherein the method comprises:
    defining in the RAM only one dedicated memory zone that is dedicated to the exchanged data, the only one dedicated memory zone being less than an entirety of the RAM and being bounded so that it cannot be extended during operation of the processor unit,
    storing only the exchanged data in the only one dedicated memory zone,
    controlling the processor unit to store any data that is exchanged between the integrated circuit card and the external device in said only one dedicated memory zone, wherein the only one dedicated memory zone must store all of the exchanged data, and
    controlling the processor unit to limit any risk of said only one dedicated memory zone containing data that is harmful for security of the integrated circuit card, wherein the limitation of the risk that the only one dedicated zone contains data that is harmful comprises a stage of scrambling the data in the only one dedicated memory zone before transferring data from the outside in order that data received on successive occasions by the card cannot be recombined or used to constitute harmful instructions.

6. The method according to claim 5, wherein making secure includes a stage of locking access to the only one dedicated memory zone during a processing operation.

7. The method according to claim 6, wherein making secure includes the stages of evaluating a status of the data in the only one dedicated memory zone before performing a processing operation, and of verifying the integrity of the data after performing the processing operation.

8. The method according to claim 6, wherein, prior to transmitting data, making secure includes a stage of verifying that the data is contained in the only one dedicated memory zone.

9. An integrated circuit card including a processor unit associated with RAM and with data exchange means for exchanging data with an external device,
   wherein the RAM includes only one dedicated memory zone dedicated to exchanged data,
   wherein said only one dedicated memory zone is less than an entirety of the RAM and is bounded so that it cannot be extended during operation of the processor unit and it cannot be changed place in the RAM during operation of the processor unit,
   wherein only the exchanged data is stored in the only one dedicated memory zone,
   wherein the only one dedicated memory zone must store all of the exchanged data, the processor unit being arranged to store any data that is exchanged between the integrated circuit card and the external device in said only one dedicated memory zone, and
   wherein the processor unit is arranged to limit any risk of said only one dedicated memory zone containing data that is harmful for security of the integrated circuit card by being programmed to scramble the data in the only one dedicated memory zone before transferring data from the outside in order that data received on successive occasions by the card cannot be recombined or used to constitute harmful instructions.

10. A method of managing RAM of an integrated circuit card having a processor unit associated with the RAM and with data exchange means for exchanging data with an external device, wherein the method comprises:
   defining in the RAM only one dedicated memory zone that is dedicated to the exchanged data, the only one dedicated memory zone being less than an entirety of the RAM and being bounded so that it cannot be extended during operation of the processor unit and it cannot be changed place in the RAM during operation of the processor unit,
   storing only the exchanged data in the only one dedicated memory zone,
   controlling the processor unit to store any data that is exchanged between the integrated circuit card and the external device in said only one dedicated memory zone, wherein the only one dedicated memory zone must store all of the exchanged data, and
   controlling the processor unit to limit any risk of said only one dedicated memory zone containing data that is harmful for security of the integrated circuit card, wherein the limitation of the risk that the only one dedicated zone contains data that is harmful comprises a stage of scrambling the data in the only one dedicated memory zone before transferring data from the outside in order that data received on successive occasions by the card cannot be recombined or used to constitute harmful instructions.

* * * * *